US011259351B2

(12) United States Patent
Lee et al.

(10) Patent No.: US 11,259,351 B2
(45) Date of Patent: Feb. 22, 2022

(54) EN-DC TIME DIVISION MULTIPLEXING AND CARRIER AGGREGATION

(71) Applicant: QUALCOMM Incorporated, San Diego, CA (US)

(72) Inventors: Heechoon Lee, San Diego, CA (US); Peter Gaal, San Diego, CA (US); Wanshi Chen, San Diego, CA (US); Peter Pui Lok Ang, San Diego, CA (US); Yang Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 16/386,998

(22) Filed: Apr. 17, 2019

(65) Prior Publication Data
US 2019/0327779 A1    Oct. 24, 2019

Related U.S. Application Data

(60) Provisional application No. 62/660,227, filed on Apr. 19, 2018.

(51) Int. Cl.
*H04W 76/15* (2018.01)
*H04L 1/18* (2006.01)
*H04L 5/00* (2006.01)

(52) U.S. Cl.
CPC ........... *H04W 76/15* (2018.02); *H04L 1/1812* (2013.01); *H04L 1/1887* (2013.01); *H04L 5/001* (2013.01); *H04L 5/0092* (2013.01); *H04L 5/0098* (2013.01)

(58) Field of Classification Search
CPC .... H04W 76/15; H04L 1/1812; H04L 1/1887; H04L 5/001; H04L 5/0092; H04L 5/0098
See application file for complete search history.

(56) References Cited

U.S. PATENT DOCUMENTS

| 2014/0022960 A1* | 1/2014 | Fu ......................... H04L 5/0055 370/280 |
| 2015/0092632 A1* | 4/2015 | Park ..................... H04L 1/1887 370/280 |

(Continued)

FOREIGN PATENT DOCUMENTS

| WO | WO-2014089107 A1 * | 6/2014 | ............. H04W 72/08 |
| WO | WO-2017027997 A1 * | 2/2017 | ........... H04L 1/1887 |

OTHER PUBLICATIONS

Huawei et al., "Discussion on Remaining Issues for SUL and EN-DC", 3GPP Draft; R1-1803656, 3rd Generation Partnership Project (3GPP), Mobile Competence Centre, 650, Route Des Lucioles, F-06921 Sophia-Anti Polis Cedex, France, vol. RAN WG1, No. Sanya, China; Apr. 16, 2018-Apr. 20, 2018, Apr. 15, 2018 (Apr. 15, 2018), 6 Pages, XP051425953, Retrieved from the Internet: URL: http://www.3gpp.org/ftp/Meetings_3GPP_SYNC/RAN1/Docs/ [retrieved on Apr. 15, 2018], p. 1—Paragraph 1, p. 2—Paragraph 2.1, p. 3—Paragraph 2.2.

(Continued)

*Primary Examiner* — Alpus Hsu
*Assistant Examiner* — Camquyen Thai
(74) *Attorney, Agent, or Firm* — Harrity & Harrity LLP/Qualcomm Incorporated

(57) ABSTRACT

Various aspects of the present disclosure generally relate to wireless communication. In some aspects, a wireless communication device may determine a component carrier configuration for a primary cell of the wireless communication device, wherein the wireless communication device is configured for dual connectivity with regard to a 4G/Long Term Evolution (LTE) network and a 5G/New Radio network; and apply a hybrid automatic repeat request (HARQ) timing configuration for a secondary cell of the wireless commu- (Continued)

nication device based at least in part on the component carrier configuration. Numerous other aspects are provided.

30 Claims, 7 Drawing Sheets

(56) References Cited

U.S. PATENT DOCUMENTS

| | | | | |
|---|---|---|---|---|
| 2015/0124664 A1* | 5/2015 | Park | ............... | H04L 5/0092 370/280 |
| 2015/0124670 A1* | 5/2015 | Park | ............... | H04L 1/1887 370/281 |
| 2015/0304087 A1* | 10/2015 | He | ............... | H04W 72/048 370/280 |
| 2015/0304095 A1* | 10/2015 | Larsson | ............... | H04L 1/1861 370/280 |
| 2015/0327269 A1* | 11/2015 | Kim | ............... | H04W 72/0413 370/329 |
| 2016/0013896 A1* | 1/2016 | Sun | ............... | H04L 5/14 370/280 |
| 2016/0014753 A1* | 1/2016 | Wu | ............... | H04W 74/0833 370/280 |
| 2016/0157226 A1* | 6/2016 | Moon | ............... | H04W 72/0406 370/280 |
| 2016/0205690 A1* | 7/2016 | Berggren | ............... | H04L 1/1854 370/280 |
| 2016/0212711 A1* | 7/2016 | Yi | ............... | H04W 52/281 |
| 2016/0241363 A1* | 8/2016 | Noh | ............... | H04L 1/1861 |
| 2016/0270060 A1* | 9/2016 | Kusashima | ............... | H04W 72/042 |
| 2018/0062796 A1* | 3/2018 | Feng | ............... | H04L 1/1812 |
| 2018/0083743 A1 | 3/2018 | Chen et al. | | |
| 2018/0098312 A1* | 4/2018 | Lin | ............... | H04L 5/0007 |
| 2018/0278373 A1* | 9/2018 | Wang | ............... | H04L 1/1812 |
| 2018/0332603 A1* | 11/2018 | Takeda | ............... | H04L 5/14 |

OTHER PUBLICATIONS

Huawei et al., "Remaining Issues on NR CA and DC", 3GPP Draft; R1-1800021, 3rd Generation Partnership Project (3GPP), Mobile Competence Centre, 650, Route Des Lucioles, F-06921 Sophia-Anti Polis Cedex, France, vol. RAN WG1, No. Vancouver, Canada; Jan. 22, 2018-Jan. 26, 2018, Jan. 13, 2018 (Jan. 13, 2018), 13 Pages, XP051384524, Retrieved from the Internet: URL: https://www.3gpp.org/ftp/tsg_ran/WG1_RL1/TSGR1_AH/NR_AH_1801/Docs/ [retrieved on Jan. 13, 2018], p. 4—Paragraph 2.2.2.
International Search Report and Written Opinion—PCT/US2019/028141—ISA/EPO—dated Jun. 24, 2019.
Nokia et al., "On LTE HARQ ACK Feedback in 1Tx EN-DC", 3GPP Draft; R1-1720483, 3rd Generation Partnership Project (3GPP), Mobile Competence Centre, 650, Route Des Lucioles, F-06921 Sophia-Anti Polis Cedex, France, vol. RAN WG1, No. Reno, USA; Nov. 27, 2017-Dec. 1, 2017, Nov. 17, 2017 (Nov. 17, 2017), 3 Pages, XP051369000, Retrieved from the Internet: URL: http://www.3gpp.org/ftp/tsg_ran/WG1_RL1/TSGR1_91/Docs [retrieved on Nov. 17, 2017], p. 1—Paragraph 1, p. 2—Paragraph 2.

* cited by examiner

EN-DC TIME DIVISION MULTIPLEXING AND CARRIER AGGREGATION

CROSS-REFERENCE TO RELATED APPLICATIONS UNDER 35 U.S.C. § 119

This application claims priority to Provisional Patent Application No. 62/660,227, filed on Apr. 19, 2018, entitled "TECHNIQUES AND APPARATUSES FOR EN-DC TIME DIVISION MULTIPLEXING AND CARRIER AGGREGATION," which is hereby expressly incorporated by reference herein.

FIELD OF THE DISCLOSURE

Aspects of the present disclosure generally relate to wireless communication, and to techniques and apparatuses for E-UTRAN-New Radio dual connectivity (EN-DC) time division multiplexing (TDM) and carrier aggregation (CA).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include determining a component carrier configuration for a primary cell of the wireless communication device, wherein the wireless communication device is configured for dual connectivity with regard to a 4G/Long Term Evolution (LTE) network and a 5G/New Radio network; and applying a hybrid automatic repeat request (HARQ) timing configuration for a secondary cell of the wireless communication device based at least in part on the component carrier configuration.

In some aspects, a wireless communication device for wireless communication may include memory and one or more processors operatively coupled to the memory. The memory and the one or more processors may be configured to determine a component carrier configuration for a primary cell of the wireless communication device, wherein the wireless communication device is configured for dual connectivity with regard to a 4G/LTE network and a 5G/New Radio network; and apply a HARQ timing configuration for a secondary cell of the wireless communication device based at least in part on the component carrier configuration.

In some aspects, a non-transitory computer-readable medium may store one or more instructions for wireless communication. The one or more instructions, when executed by one or more processors of a wireless communication device, may cause the one or more processors to determine a component carrier configuration for a primary cell of the wireless communication device, wherein the wireless communication device is configured for dual connectivity with regard to a 4G/LTE network and a 5G/New Radio network; and apply a HARQ timing configuration for a secondary cell of the wireless communication device based at least in part on the component carrier configuration.

In some aspects, an apparatus for wireless communication may include means for determining a component carrier configuration for a primary cell of the apparatus, wherein the apparatus is configured for dual connectivity with regard to a 4G/LTE network and a 5G/New Radio network; and means for applying a HARQ timing configuration for a secondary cell of the apparatus based at least in part on the component carrier configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
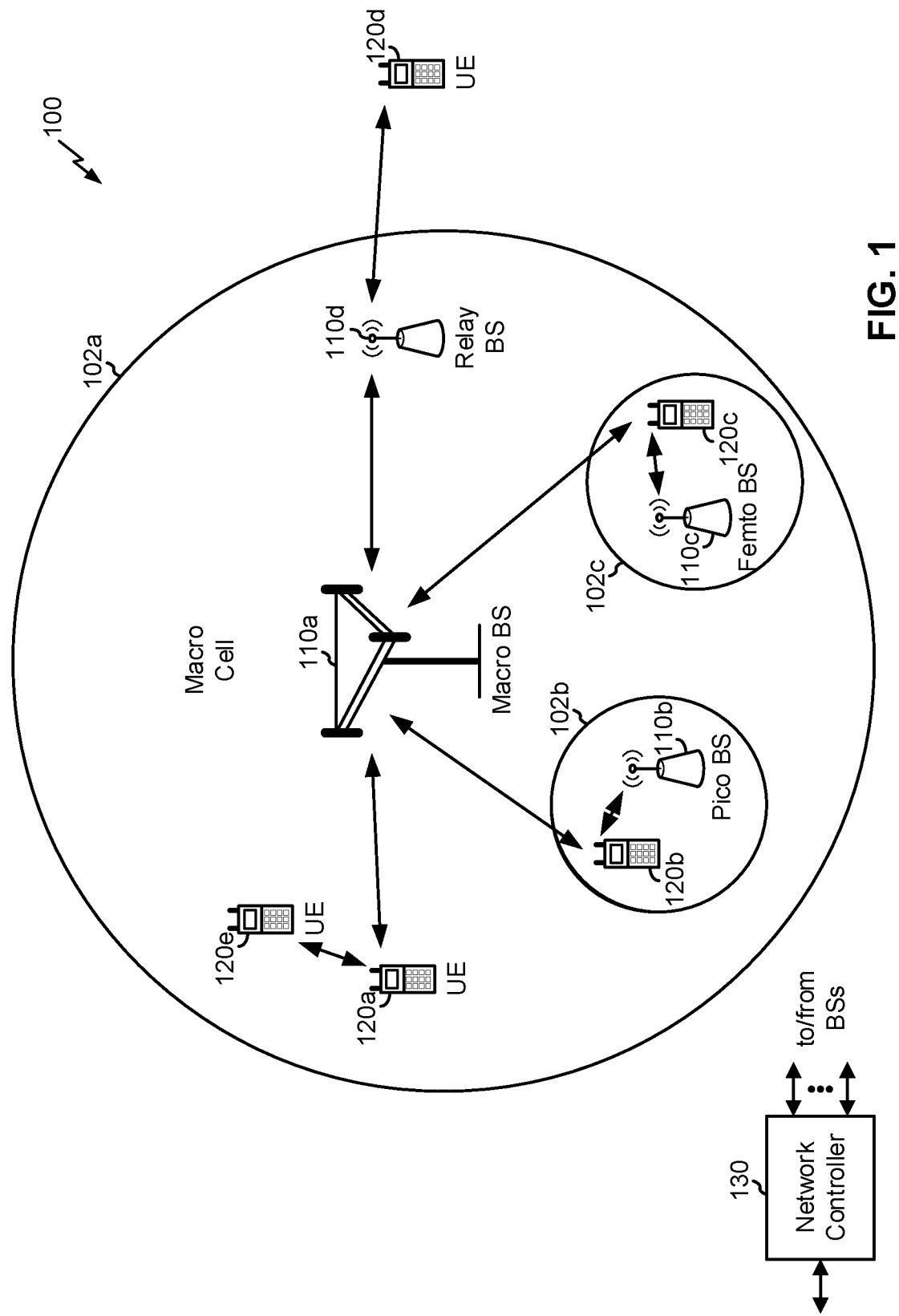
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
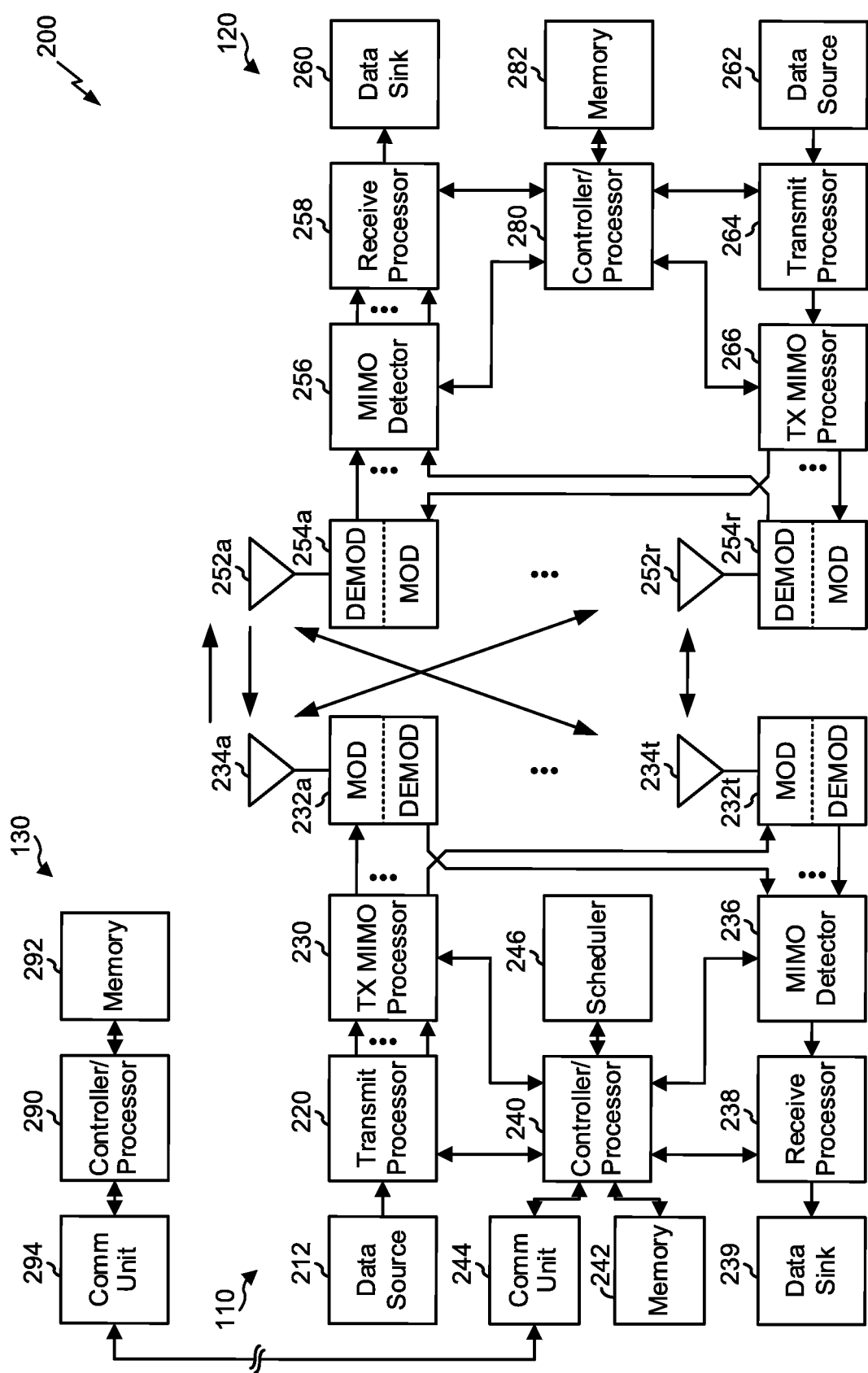
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. In some aspects, one or more components of UE 120 may be included in a housing.

Controller/processor 240 of base station 110, controller/processor 280 of UE 120, and/or any other component(s) of FIG. 2 may perform one or more techniques associated with EN-DC TDM and CA, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. A scheduler 246 may schedule UEs for data transmission on the downlink and/or uplink.

In some aspects, a wireless communication device (e.g., BS 110 or UE 120) may include means for determining a component carrier configuration for a primary cell of the wireless communication device, wherein the wireless communication device is configured for dual connectivity with regard to a 4G/Long Term Evolution (LTE) network and a 5G/New Radio network, means for determining a hybrid automatic repeat request (HARQ) timing configuration for a secondary cell of the wireless communication device based at least in part on the first HARQ timing, and/or the like. In some aspects, such means may include one or more components of B S 110 or UE 120 described in connection with FIG. 2.

As indicated above, FIG. 2 is provided as an example. Other examples may differ from what is described with regard to FIG. 2.

Figure 3A:
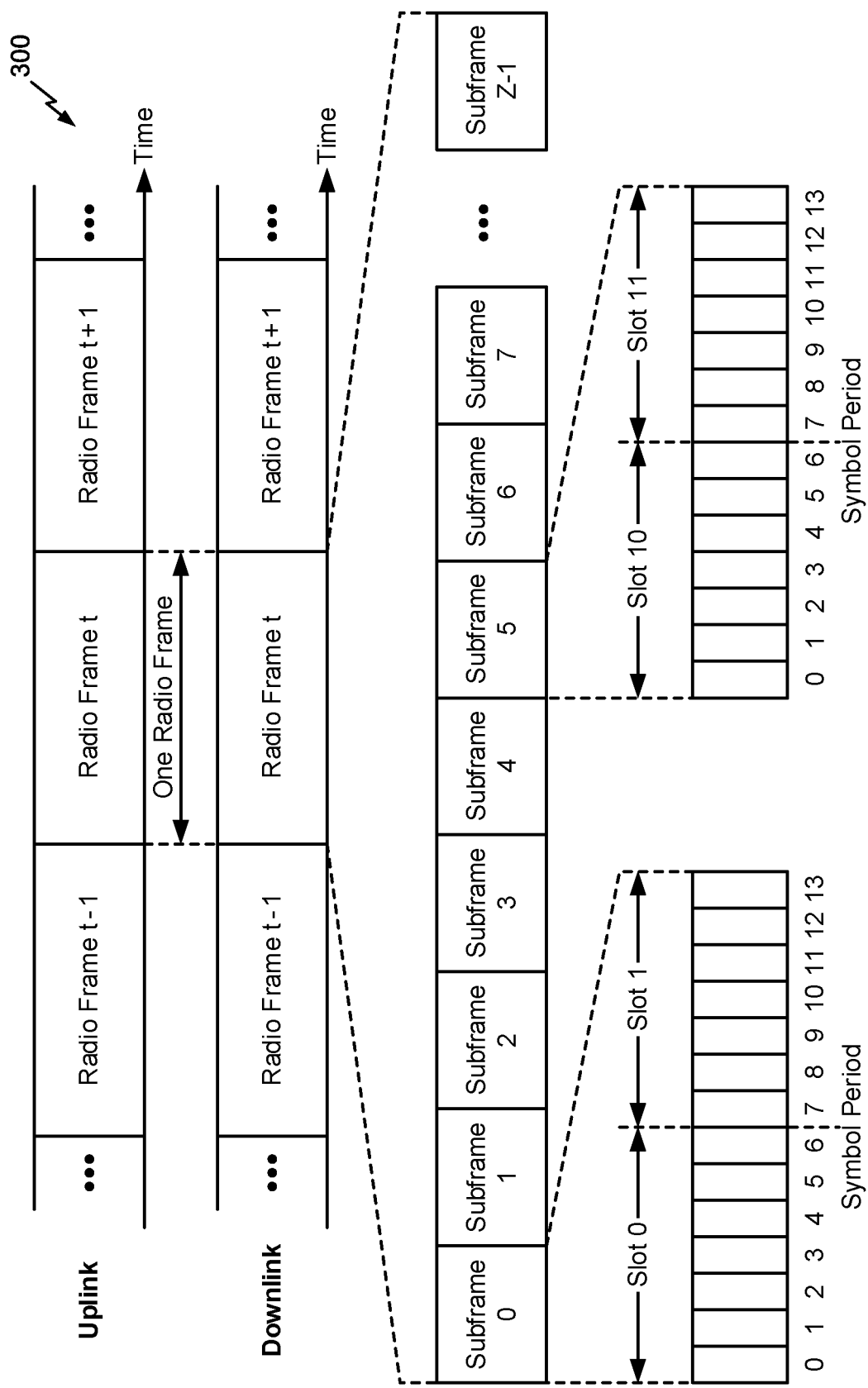
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
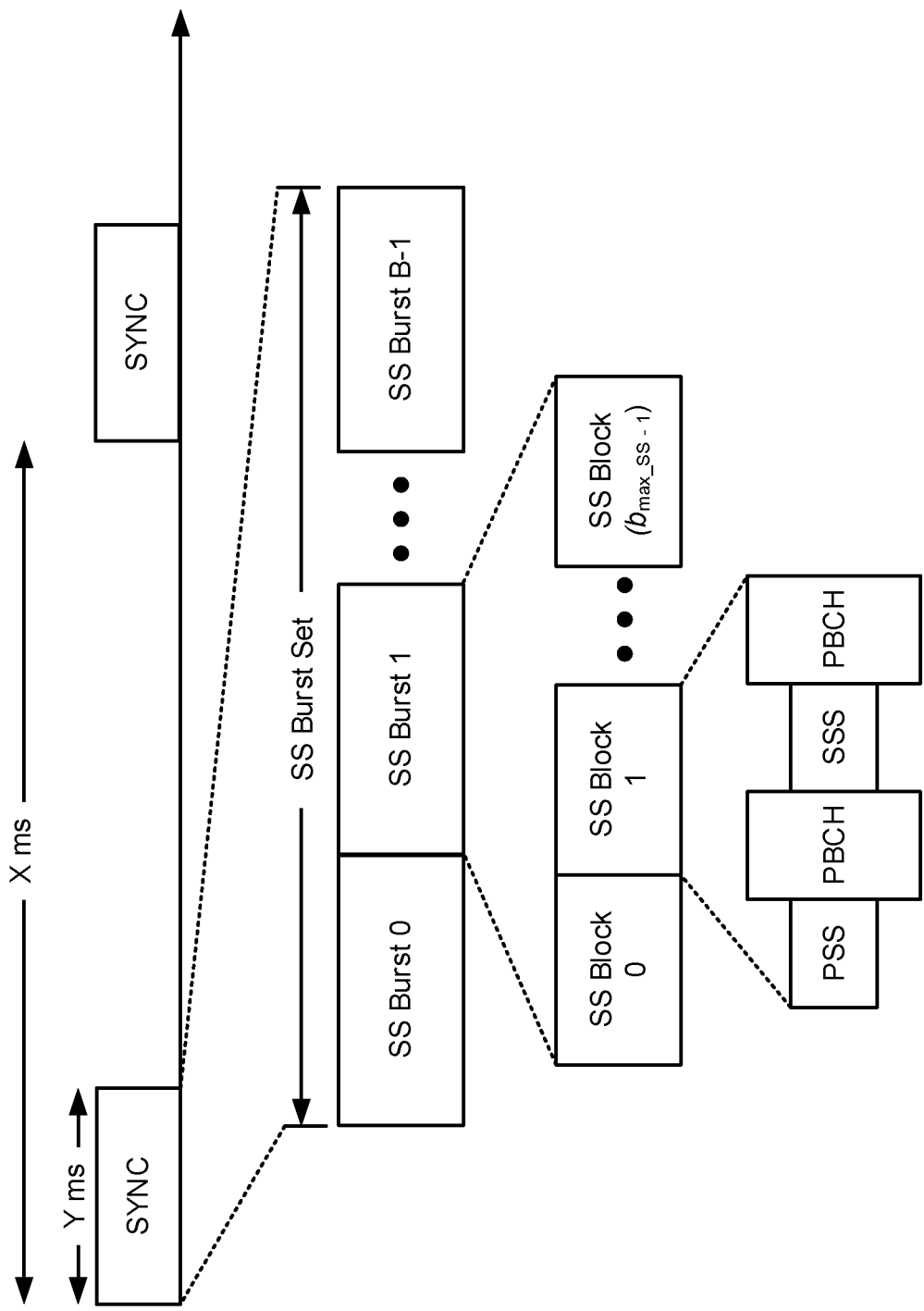
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\ ss-1}$), where $b_{max\ ss-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
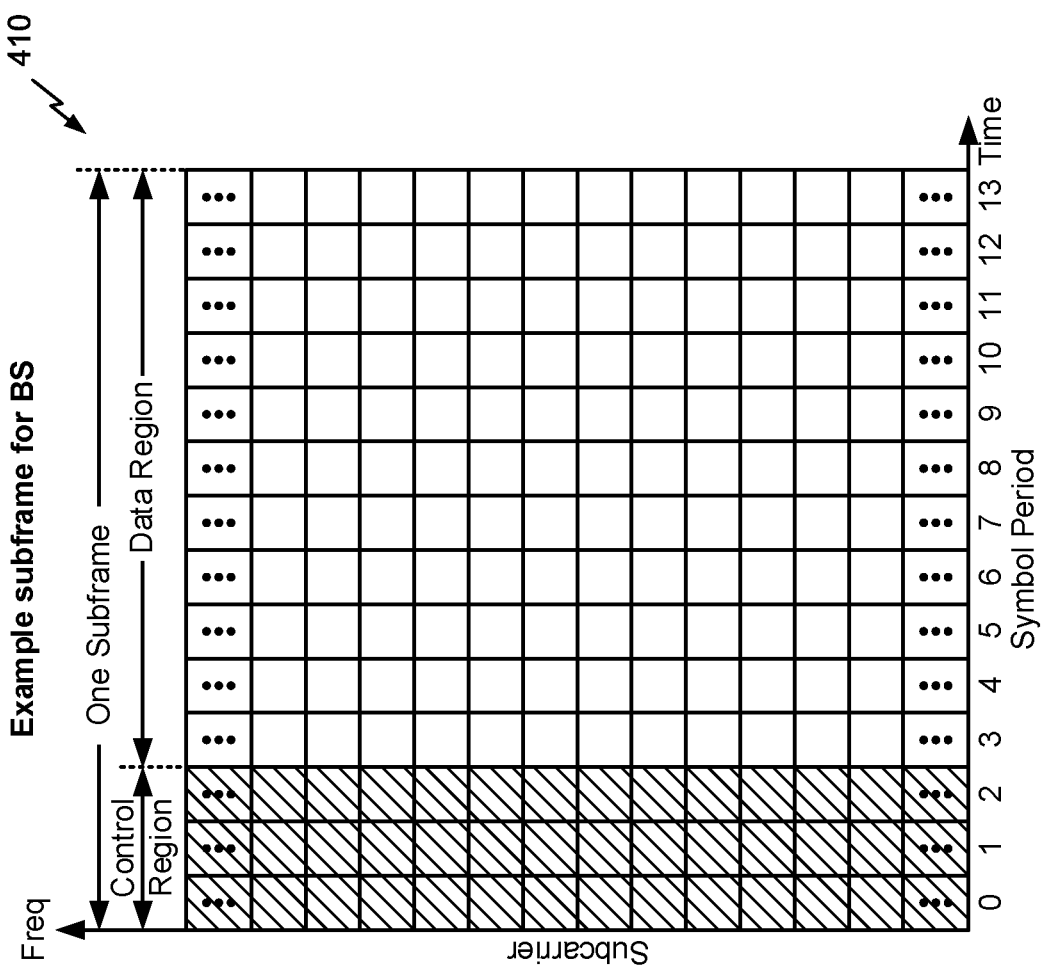
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

As indicated above, FIG. 4 is provided as an example. Other examples may differ from what was described with regard to FIG. 4.

Dual connectivity provides communication with regard to two or more radio access technologies (RATs). One dual connectivity configuration is E-UTRAN-NR dual connectivity (EN-DC) between an Evolved Universal Mobile Telecommunications System (UMTS) Terrestrial Radio Access network (E-UTRAN), such as 4G/LTE, and a NR network, such as 5G/NR. For a UE performing EN-DC, data may be received on both a 4G/LTE connection and a 5G/NR connection (e.g., on a secondary cell group split bearer), although other configurations may be used. These connections are sometimes referred to as "legs."

In some cases, the primary cell (PCell) and the secondary cell (SCell) for EN-DC may have different component carrier configurations. Thus, it may be important to properly configure HARQ timing for different combinations of CA (e.g., for EN-DC) to avoid intermodulation distortion when there is a HARQ timing restriction due to the coexistence of 4G/LTE and 5G/NR or due to another reason. Some techniques and apparatuses described herein may provide HARQ timing configurations for a secondary cell of a wireless communication device based at least in part on a component carrier configuration of the primary cell and/or the secondary cell. Thus, intermodulation distortion may be reduced and HARQ may be enabled for EN-DC wireless communication devices.

A first case (hereinafter Case 1) and a second case (hereinafter Case 2) for the component carrier configuration, such as the HARQ timing configuration, are described herein. In Case 1, component carriers or uplinks configured for a UE may have the same numerology, overlapping transmissions between different component carriers or uplinks with the same starting time and the same physical uplink shared channel (PUSCH)/physical uplink control channel (PUCCH) transmission duration may be permitted, and one or two PUCCH groups may be used. In Case 2, component carriers or uplinks configured for a UE may have the same or different numerologies, partially overlapping transmissions between different component carriers or uplinks may be permitted, the same or different transmission durations may be used, and one or two PUCCH groups may be used.

In some aspects, Case 1 HARQ timing is not used on a frequency division duplexing (FDD) primary cell (PCell), and, for an FDD secondary cell (SCell), the Case 1 HARQ timing is applied to the FDD SCell. In this case, FDD DL HARQ timing may be applied for the FDD SCell, Case 1 uplink (UL) scheduling/HARQ timing may be applied for the FDD SCell, and/or the UE may not be expected to transmit any UL signals/channels in subframes other than the offset UL subframes according to the Case 1 HARQ reference configuration. In some aspects, the Case 1 HARQ timing is not applied to the FDD SCell. In this case, FDD DL HARQ timing may be applied for the FDD SCell, an FDD UL HARQ timing may be applied for the FDD SCell, and/or there may be no restriction regarding the UL subframes on which the UE can transmit UL signals or channels.

In some aspects, for a time division duplexing (TDD) SCell for which the Case 1 HARQ timing is applied, the UL/DL configuration may be the same as the Case 1 reference configuration, the DL scheduling/HARQ timing on the TDD SCell may follow timing of the TDD SCell's own UL/DL configuration, and/or the UL scheduling/HARQ timing on the TDD SCell may follow timing of the TDD SCell's own UL/DL configuration. On the TDD SCell, the UE may not be allowed to perform an UL transmission in the uplink pilot time slot (UpPTS) of the special subframe of the UE's own UL/DL configuration. In some aspects, for a TDD SCell for which the Case 1 HARQ timing is not applied to the TDD SCell, the DL scheduling/HARQ timing on the TDD Scell may follow timing of the TDD SCell's own UL/DL configuration, the UL scheduling/HARQ timing on the TDD SCcell may follow timing of the TDD SCell's own UL/DL configuration, and there may be no restriction regarding the UL subframes on which the UE can transmit UL signals or channels other than the UE 120's own UL/DL configuration.

In some aspects, Case 1 HARQ timing on an FDD PCell may be used. In such a case, for an FDD SCell, if the Case 1 HARQ timing is applied to the FDD SCell, the same DL HARQ timing as the PCell is applied for the FDD SCell, the same UL scheduling and/or HARQ timing as the PCell is applied for the FDD SCell, and the UE may not be expected to transmit any UL signals or channels in subframes other than the offset UL subframes according to the Case 1 HARQ reference configuration of the PCell. In some aspects, for an FDD SCell, if the Case 1 HARQ timing is not applied to the FDD SCell, the same DL HARQ timing as the PCell is applied for the FDD SCell, the FDD UL scheduling and/or HARQ timing may be used, and there may be no restriction regarding the UL subframes on which the UE can transmit UL signals/channels.

In some aspects, for a TDD SCell, if Case 1 HARQ timing is applied to the TDD SCell, the UL/DL configuration may be the same as the reference configuration on the FDD PCell, the same DL HARQ timing as the PCell may be applied to the TDD Scell, and/or the UL scheduling and/or HARQ timing on the TDD SCell may follow timing of the TDD Scell's own UL/DL configuration. On the TDD SCell, the UE may not be allowed UL transmission in the UpPTS of the special subframe of its own UL/DL configuration.

In some aspects, for a TDD SCell, if the Case 1 HARQ timing is not applied for the TDD SCell, the same DL HARQ timing as the PCell may be applied to the TDD SCell, the UL scheduling and/or HARQ timing on the TDD SCell follows timing of the TDD SCell's own UL/DL configuration, and there may be no restriction with regard to UL subframes in which the UE can transmit UL signals and/or channels other than the UE 120's own UL/DL configuration.

Figure 5:
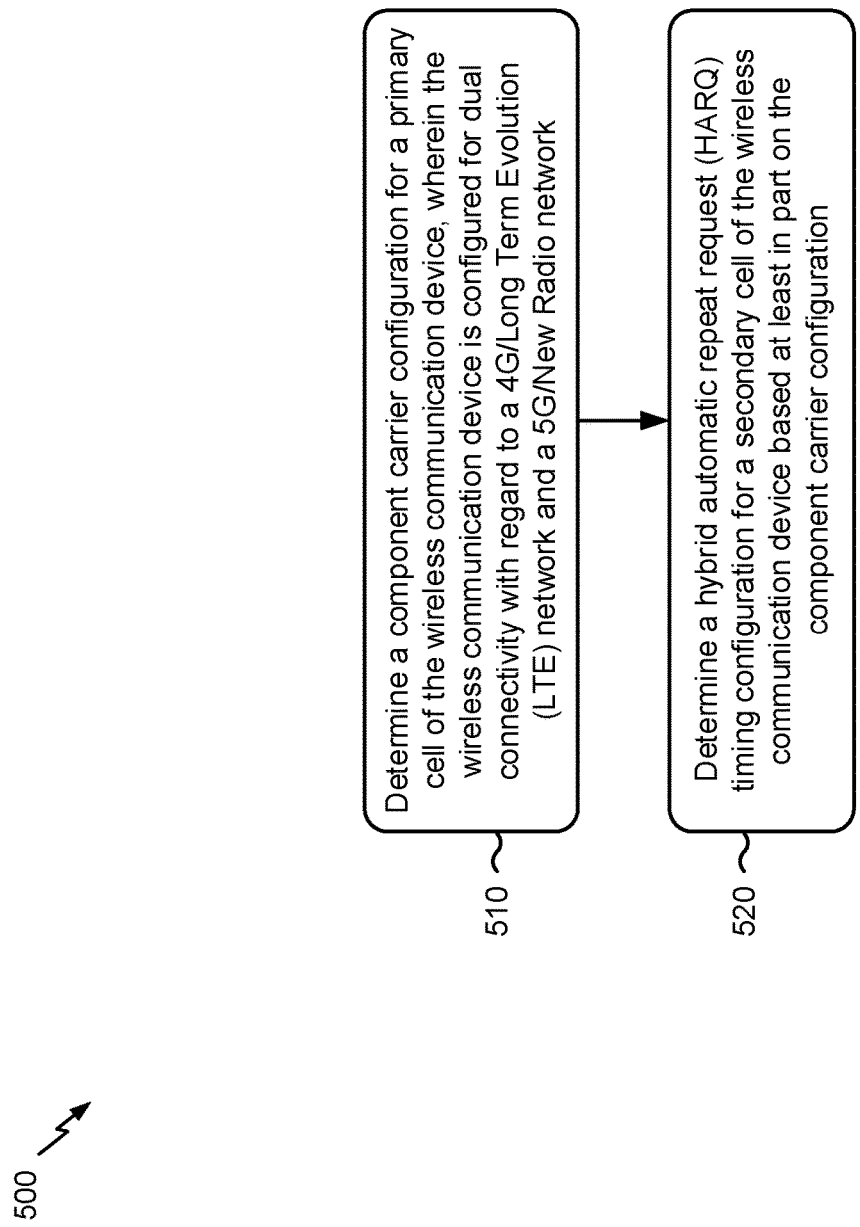
FIG. 5 is a diagram illustrating an example process performed, for example, by a wireless communication device, in accordance with various aspects of the present disclosure.

FIG. 5 is a diagram illustrating an example process 500 performed, for example, by a wireless communication device, in accordance with various aspects of the present disclosure. Example process 500 is an example where a wireless communication device (e.g., BS 110, UE 120, etc.) performs EN-DC TDM and CA.

As shown in FIG. 5, in some aspects, process 500 may include determining a component carrier configuration for a primary cell of the wireless communication device, wherein the wireless communication device is configured for dual connectivity with regard to a 4G/Long Term Evolution (LTE) network and a 5G/New Radio network (block 510). For example, the wireless communication device (e.g., using controller/processor 240, controller/processor 280, and/or the like) may determine a component carrier configuration for a primary cell of the wireless communication device. The wireless communication device may be configured for dual connectivity (e.g., EN-DC) on a 4G/LTE network and a 5G/NR network.

As shown in FIG. 5, in some aspects, process 500 may include applying a hybrid automatic repeat request (HARQ) timing configuration for a secondary cell of the wireless communication device based at least in part on the component carrier configuration (block 520). For example, the wireless communication device (e.g., using controller/processor 280, transmit processor 264, TX MIMO processor 266, MOD 254, antenna 252, DEMOD 254, MIMO detector 256, receive processor 258, 280, and/or the like) may determine and/or apply a HARQ timing configuration for a secondary cell of the wireless communication device based at least in part on the component carrier configuration. In some aspects, the wireless communication device may determine and/or apply a component carrier configuration for the secondary cell based at least in part on the component carrier configuration of the primary cell. For example, the wireless communication device may determine and/or apply an uplink scheduling configuration based at least in part on an uplink scheduling configuration of the primary cell.

Process 500 may include additional aspects, such as any single aspect or any combination of aspects described below and/or in connection with one or more other processes described elsewhere herein.

In a first aspect, the component carrier configuration permits component carriers or uplinks with a same numerology, overlapping transmission between different component carriers or uplinks with a same starting time, a same uplink shared channel or uplink control channel duration, and one or two uplink control channel groups.

In a second aspect, the component carrier configuration permits component carriers or uplinks with a same numerology or different numerologies, partially overlapping transmissions between different component carriers or uplinks, a same or different transmission duration, and one or two uplink control channel groups.

In a third aspect, alone or in combination with one or more of the first and second aspects, when the secondary cell is configured for frequency division duplexing, and when the component carrier configuration is used for the secondary cell, the HARQ timing configuration is a frequency division duplexing downlink configuration.

In a fourth aspect, alone or in combination with one or more of the first through third aspects, when the secondary cell is configured for frequency division duplexing, and when the component carrier configuration is used for the secondary cell, the HARQ timing configuration for an uplink of the secondary cell is equal to a HARQ timing configuration associated with the component carrier configuration.

In a fifth aspect, alone or in combination with one or more of the first through fourth aspects, when the secondary cell is configured for frequency division duplexing, and when the component carrier configuration is not used for the secondary cell, the HARQ timing configuration is a frequency division duplexing downlink configuration.

In a sixth aspect, alone or in combination with one or more of the first through fifth aspects, when the secondary cell is configured for frequency division duplexing, and when the component carrier configuration is not used for the secondary cell, the HARQ timing configuration is a frequency division duplexing uplink configuration.

In a seventh aspect, alone or in combination with one or more of the first through sixth aspects, when the secondary cell is configured for time division duplexing, and when the component carrier configuration is used for the secondary cell, the HARQ timing configuration follows a timing of an uplink or downlink configuration of the secondary cell for an uplink or for a downlink.

In an eighth aspect, alone or in combination with one or more of the first through seventh aspects, when the secondary cell is configured for time division duplexing, and when the component carrier configuration is used for the secondary cell, the wireless communication device is configured not to transmit in an uplink pilot time slot.

In a ninth aspect, alone or in combination with one or more of the first through eighth aspects, when the secondary cell is configured for time division duplexing, and when the component carrier configuration is not used for the secondary cell, the HARQ timing configuration follows a timing of an uplink or downlink configuration of the secondary cell for an uplink or for a downlink.

In a tenth aspect, alone or in combination with one or more of the first through ninth aspects, when the secondary cell is configured for time division duplexing, and when the component carrier configuration is not used for the secondary cell, the wireless communication device is not restricted from transmitting in an uplink pilot time slot.

In an eleventh aspect, alone or in combination with one or more of the first through tenth aspects, when the secondary cell is configured for frequency division duplexing, and when the component carrier configuration is used for the secondary cell, the HARQ timing configuration or a scheduling configuration for an uplink or a downlink of the secondary cell is equal to a HARQ timing configuration of the primary cell.

In a twelfth aspect, alone or in combination with one or more of the first through eleventh aspects, when the secondary cell is configured for frequency division duplexing, and when the component carrier configuration is not used for the secondary cell, the HARQ timing configuration or a scheduling configuration for a downlink of the secondary cell is equal to a HARQ timing configuration of the primary cell.

In a thirteenth aspect, alone or in combination with one or more of the first through twelfth aspects, when the secondary cell is configured for frequency division duplexing, and when the component carrier configuration is not used for the secondary cell, the HARQ timing configuration is a frequency division duplexing uplink configuration.

In a fourteenth aspect, alone or in combination with one or more of the first through thirteenth aspects, when the secondary cell is configured for time division duplexing, and when the component carrier configuration is used for the secondary cell, the HARQ timing configuration or a scheduling configuration for a downlink of the secondary cell is equal to a HARQ timing configuration of the primary cell.

In a fifteenth aspect, alone or in combination with one or more of the first through fourteenth aspects, when the secondary cell is configured for time division duplexing, and when the component carrier configuration is used for the secondary cell, the HARQ timing configuration or a scheduling configuration for an uplink of the secondary cell follows a timing of an uplink or downlink configuration of the secondary cell for an uplink or for a downlink.

In a sixteenth aspect, alone or in combination with one or more of the first through fifteenth aspects, when the secondary cell is configured for time division duplexing, and when the component carrier configuration is used for the secondary cell, the wireless communication device is configured not to transmit in an uplink pilot time slot.

In a seventeenth aspect, alone or in combination with one or more of the first through sixteenth aspects, when the secondary cell is configured for time division duplexing, and when the component carrier configuration is not used for the secondary cell, the HARQ timing configuration or a scheduling configuration for a downlink of the secondary cell is equal to a HARQ timing configuration of the primary cell.

In an eighteenth aspect, alone or in combination with one or more of the first through seventeenth aspects, when the secondary cell is configured for time division duplexing, and when the component carrier configuration is not used for the secondary cell, the HARQ timing configuration or a scheduling configuration for an uplink of the secondary cell follows a timing of an uplink or downlink configuration of the secondary cell.

In a nineteenth aspect, alone or in combination with one or more of the first through eighteenth aspects, the wireless communication device is not expected to transmit an uplink signal or channel in a subframe other than offset uplink subframes in accordance with a HARQ reference configuration of the primary cell.

In a twentieth aspect, alone or in combination with one or more of the first through nineteenth aspects, the wireless communication device is permitted to transmit an uplink signal or channel in an uplink subframe irrespective of whether the uplink subframe is associated with a HARQ reference configuration of the primary cell.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
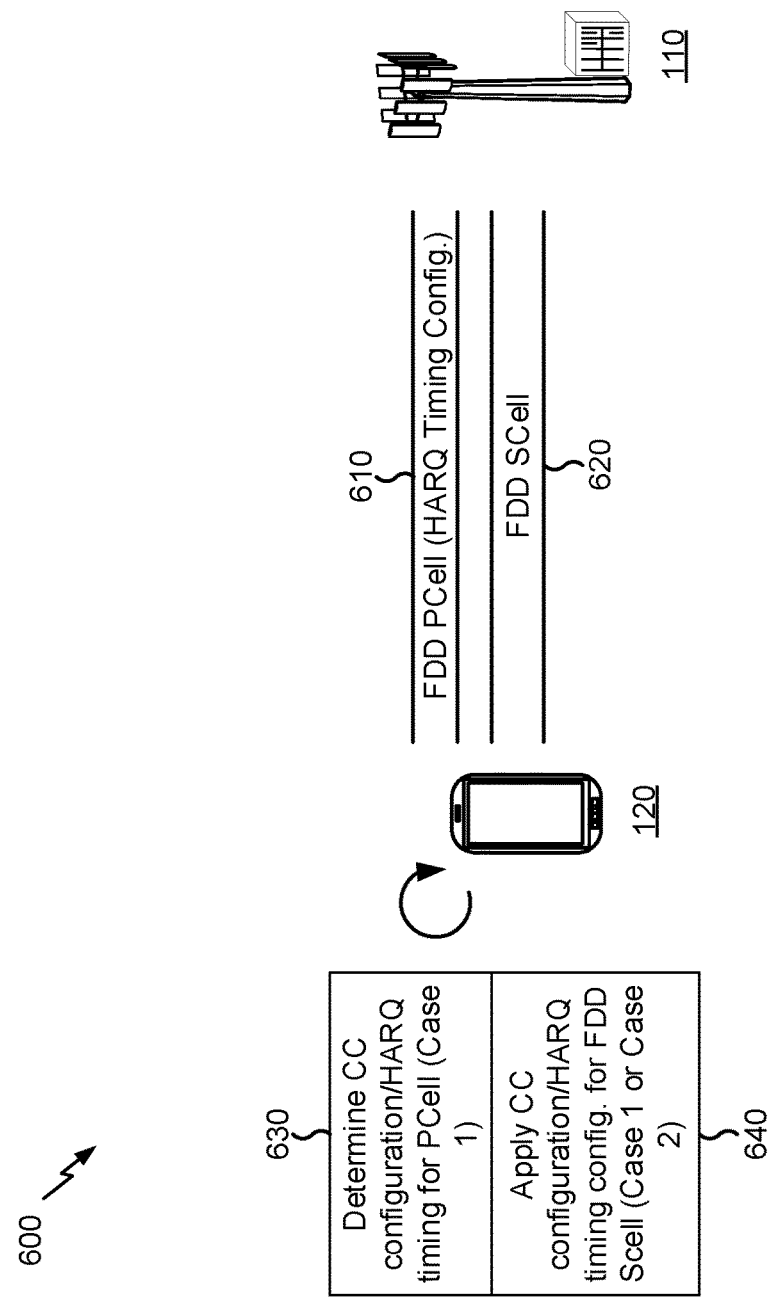
FIG. 6 is a diagram illustrating an example of determining a component carrier configuration for a secondary cell in accordance with a component carrier configuration for a primary cell, in accordance with various aspects of the present disclosure.

FIG. 6 is a diagram illustrating an example 600 of determination of an SCell component carrier configuration based at least in part on a PCell component carrier configuration. As shown in FIG. 6, a UE 120 may be associated with a PCell (shown by reference number 610) and an SCell (shown by reference number 620), which may be provided by a BS 110. In some aspects, the PCell and the SCell may be provided by the same BS 110. In some aspects, the PCell and the SCell may be provided by different BSs 110. In some aspects, the PCell and the SCell may be associated with the same RAT. In some aspects, the PCell and the SCell may be associated with different RATs. As further shown, the PCell and the SCell may be configured to use FDD.

As shown in FIG. 6, and by reference number 630, the UE 120 may determine a component carrier (CC) configuration for the FDD PCell. For example, the UE 120 may determine the CC configuration based at least in part on the FDD PCell being associated with HARQ Timing Case 1. In some aspects, the CC configuration may identify a DL HARQ timing configuration, a UL HARQ timing configuration, an uplink scheduling configuration, and/or the like. In some aspects, the UE 120 may determine the CC configuration based at least in part on configuration information for the PCell, control information for the PCell, synchronization information for the PCell, and/or the like.

As shown by reference number 640, the UE 120 may apply the CC configuration (e.g., the DL HARQ timing configuration, the UL HARQ timing configuration, the uplink scheduling configuration, and/or the like) for the TDD SCell. For example, the UE 120 may perform a DL HARQ operation and/or a UL HARQ operation on the SCell in accordance with the HARQ timing configuration of the FDD PCell. As another example, the UE 120 may process scheduling information in accordance with the uplink scheduling configuration. In some aspects, the UE 120 may apply the CC configuration for the TDD SCell based at least in part on the TDD SCell being associated with the HARQ timing Case 1. In some aspects, the UE 120 may apply the CC configuration for the TDD SCell based at least in part on the TDD SCell being associated with the HARQ timing Case 2. In this way, the UE 120 may reduce intermodulation interference between the PCell and the SCell.

As indicated above, FIG. 6 is provided as an example. Other examples may differ from what is described in connection with FIG. 6.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of aspects. In fact, many of these features may be combined in ways not specifically recited in the claims and/or disclosed in the specification. Although each dependent claim listed below may directly depend on only one claim, the disclosure of aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a wireless communication device, comprising:
   determining a component carrier configuration for a primary cell of the wireless communication device, wherein the wireless communication device is configured for dual connectivity with regard to a 4G/Long Term Evolution (LTE) network and a 5G/New Radio network; and
   determining, when a secondary cell of the wireless communication device is configured for frequency division duplexing and when the component carrier configuration is used for the secondary cell, a hybrid automatic repeat request (HARQ) timing configuration, for the secondary cell, is a frequency division duplexing downlink configuration or is equal to a HARQ timing configuration associated with the component carrier configuration,
   wherein, when the secondary cell is configured for frequency division duplexing and when the component carrier configuration is not used for the secondary cell, the HARQ timing configuration, is the frequency division duplexing downlink configuration or a frequency division duplexing uplink configuration.

2. The method of claim 1, wherein the component carrier configuration permits component carriers or uplinks with a same numerology, overlapping transmission between different component carriers or uplinks with a same starting time, a same uplink shared channel or uplink control channel duration, and one or two uplink control channel groups.

3. The method of claim 1, wherein the component carrier configuration permits component carriers or uplinks with a same numerology or different numerologies, partially overlapping transmissions between different component carriers or uplinks, a same or different transmission duration, and one or two uplink control channel groups.

4. The method of claim 1, wherein, when the secondary cell is configured for frequency division duplexing and when the component carrier configuration is not used for the secondary cell, the HARQ timing configuration for a downlink of the secondary cell is equal to a HARQ timing configuration of the primary cell.

5. The method of claim 1, wherein the HARQ timing configuration is the frequency division duplexing uplink configuration.

6. The method of claim 1, wherein the wireless communication device is not expected to transmit an uplink signal or channel in a subframe other than offset uplink subframes in accordance with a HARQ reference configuration of the primary cell.

7. The method of claim 1, wherein the wireless communication device is permitted to transmit an uplink signal or channel in an uplink subframe irrespective of whether the uplink subframe is associated with a HARQ reference configuration of the primary cell.

8. The method of claim 1, wherein, when the component carrier configuration is used for the secondary cell, the HARQ timing configuration is the frequency division duplexing downlink configuration.

9. The method of claim 1, wherein, when the component carrier configuration is used for the secondary cell, the HARQ timing configuration is equal to the HARQ timing configuration associated with the component carrier configuration.

10. The method of claim 1, wherein, when the component carrier configuration is not used for the secondary cell, the HARQ timing configuration is the frequency division duplexing downlink configuration.

11. A wireless communication device, comprising:
one or more memories; and
one or more processors communicatively coupled to the one or more memories, configured to:
determine a component carrier configuration for a primary cell of the wireless communication device, wherein the wireless communication device is configured for dual connectivity with regard to a 4G/Long Term Evolution (LTE) network and a 5G/New Radio network; and
determine, when a secondary cell of the wireless communication device is configured for frequency division duplexing and when the component carrier configuration is used for the secondary cell, a hybrid automatic repeat request (HARQ) timing configuration for the secondary cell, that is a frequency division duplexing downlink configuration or is equal to a HARQ timing configuration associated with the component carrier configuration,
wherein, when the secondary cell is configured for frequency division duplexing and when the component carrier configuration is not used for the secondary cell, the HARQ timing configuration is the frequency division duplexing downlink configuration or a frequency division duplexing uplink configuration.

12. The wireless communication device of claim 11, wherein the component carrier configuration permits component carriers or uplinks with a same numerology, overlapping transmission between different component carriers or uplinks with a same starting time, a same uplink shared channel or uplink control channel duration, and one or two uplink control channel groups.

13. The wireless communication device of claim 11, wherein, when the secondary cell is configured for frequency division duplexing and when the component carrier configuration is not used for the secondary cell, the HARQ timing configuration for a downlink of the secondary cell is equal to a HARQ timing configuration of the primary cell.

14. The wireless communication device of claim 11, wherein the component carrier configuration permits component carriers or uplinks with a same numerology or different numerologies, partially overlapping transmissions between different component carriers or uplinks, a same or different transmission duration, and one or two uplink control channel groups.

15. The wireless communication device of claim 11, wherein the HARQ timing configuration is the frequency division duplexing uplink configuration.

16. The wireless communication device of claim 11, wherein the wireless communication device is not expected to transmit an uplink signal or channel in a subframe other than offset uplink subframes in accordance with a HARQ reference configuration of the primary cell.

17. The wireless communication device of claim 11, wherein the wireless communication device is permitted to transmit an uplink signal or channel in an uplink subframe irrespective of whether the uplink subframe is associated with a HARQ reference configuration of the primary cell.

18. The wireless communication device of claim 11, wherein, when the component carrier configuration is used for the secondary cell, the HARQ timing configuration is the frequency division duplexing downlink configuration.

19. The wireless communication device of claim 11, wherein, when the component carrier configuration is used for the secondary cell, the HARQ timing configuration is equal to the HARQ timing configuration associated with the component carrier configuration.

20. The wireless communication device of claim 11, wherein, when the component carrier configuration is not used for the secondary cell, the HARQ timing configuration is the frequency division duplexing downlink configuration.

21. A non-transitory computer-readable medium storing instructions, the instructions comprising:
one or more instructions that, when executed by one or more processors of a wireless communication device, cause the one or more processors to:
determine a component carrier configuration for a primary cell of the wireless communication device, wherein the wireless communication device is configured for dual connectivity with regard to a 4G/Long Term Evolution (LTE) network and a 5G/New Radio network; and
determine, when a secondary cell of the wireless communication device is configured for frequency division duplexing and when the component carrier configuration is used for the secondary cell, a hybrid automatic repeat request (HARQ) timing configuration, for the secondary cell, that is a frequency division duplexing downlink configuration or is equal to a HARQ timing configuration associated with the component carrier configuration,
wherein, when the secondary cell is configured for frequency division duplexing and when the component carrier configuration is not used for the secondary cell, the HARQ timing configuration is the frequency division duplexing downlink configuration or a frequency division duplexing uplink configuration.

22. The non-transitory computer-readable medium of claim 21, wherein the component carrier configuration permits component carriers or uplinks with a same numerology, overlapping transmission between different component carriers or uplinks with a same starting time, a same uplink shared channel or uplink control channel duration, and one or two uplink control channel groups.

23. The non-transitory computer-readable medium of claim 21, wherein, when the secondary cell is configured for frequency division duplexing and when the component carrier configuration is not used for the secondary cell, the HARQ timing configuration for a downlink of the secondary cell is equal to a HARQ timing configuration of the primary cell.

24. The non-transitory computer-readable medium of claim 21, wherein the component carrier configuration permits component carriers or uplinks with a same numerology or different numerologies, partially overlapping transmissions between different component carriers or uplinks, a same or different transmission duration, and one or two uplink control channel groups.

25. The non-transitory computer-readable medium of claim 21, wherein the HARQ timing configuration is the frequency division duplexing uplink configuration.

26. The non-transitory computer-readable medium of claim 21, wherein the wireless communication device is not expected to transmit an uplink signal or channel in a subframe other than offset uplink subframes in accordance with a HARQ reference configuration of the primary cell.

27. The non-transitory computer-readable medium of claim 21, wherein the wireless communication device is permitted to transmit an uplink signal or channel in an uplink subframe irrespective of whether the uplink subframe is associated with a HARQ reference configuration of the primary cell.

28. The non-transitory computer-readable medium of claim 21, wherein, when the component carrier configuration is used for the secondary cell, the HARQ timing configuration is the frequency division duplexing downlink configuration.

29. The non-transitory computer-readable medium of claim 21, wherein, when the component carrier configuration is used for the secondary cell, the HARQ timing configuration is equal to the HARQ timing configuration associated with the component carrier configuration.

30. The non-transitory computer-readable medium of claim 21, wherein, when the component carrier configuration is not used for the secondary cell, the HARQ timing configuration is the frequency division duplexing downlink configuration.

* * * * *